United States Patent
Gorbikov et al.

(10) Patent No.: US 11,912,014 B2
(45) Date of Patent: Feb. 27, 2024

(54) OFFSET PRINT APPARATUS AND METHODS

(71) Applicant: Hewlett-Packard Development Company, L.P., Spring, TX (US)

(72) Inventors: Evgeny Gorbikov, Nes Ziona (IL); Michal Shaviv Petrushevsky, Princeton, NJ (US); Martin Chauvin, Nes Ziona (IL); Ron Naveh, Nes Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 136 days.

(21) Appl. No.: 17/634,154

(22) PCT Filed: Oct. 31, 2019

(86) PCT No.: PCT/US2019/059139
§ 371 (c)(1),
(2) Date: Feb. 9, 2022

(87) PCT Pub. No.: WO2021/086376
PCT Pub. Date: May 6, 2021

(65) Prior Publication Data
US 2022/0288917 A1    Sep. 15, 2022

(51) Int. Cl.
*B41F 7/06* (2006.01)
*B41F 30/04* (2006.01)
*G03G 15/10* (2006.01)
*G03G 15/20* (2006.01)

(52) U.S. Cl.
CPC ............... *B41F 7/06* (2013.01); *B41F 30/04* (2013.01); *G03G 15/10* (2013.01); *G03G 15/2025* (2013.01); *G03G 15/2039* (2013.01); *G03G 2215/0062* (2013.01)

(58) Field of Classification Search
None
See application file for complete search history.

(56) References Cited

U.S. PATENT DOCUMENTS

| | | | |
|---|---|---|---|
| 5,189,960 | A | 3/1993 | Valentini et al. |
| 6,188,854 | B1 | 2/2001 | Coleman et al. |
| 6,505,557 | B2 | 1/2003 | Desaulniers et al. |
| 6,686,561 | B2 | 2/2004 | Horey et al. |
| 6,768,086 | B2 | 7/2004 | Sullivan et al. |

(Continued)

FOREIGN PATENT DOCUMENTS

| | | |
|---|---|---|
| CN | 101362400 A | 2/2009 |
| CN | 105398189 A | 3/2016 |

(Continued)

*Primary Examiner* — Sevan A Aydin

(57) ABSTRACT

Offset print apparatus comprises: a blanket to receive print agent; a non-contact temperature sensor to monitor electromagnetic radiation from a measurement location of the blanket and generate a respective output; and a controller to: receive the output from the non-contact temperature sensor; determine coverage information relating to a print agent coverage of the blanket at the measurement location; and calculate a temperature of the blanket at the measurement location taking into account both the output from the non-contact temperature sensor and the determined coverage information.

15 Claims, 5 Drawing Sheets

(56) References Cited

U.S. PATENT DOCUMENTS

| | | |
|---|---|---|
| 7,079,782 B2 | 7/2006 | Sone et al. |
| 7,275,798 B2 | 10/2007 | Im |
| 7,523,706 B2 | 4/2009 | Schneider et al. |
| 8,873,105 B2 | 10/2014 | Elter et al. |
| 10,369,815 B2 | 8/2019 | Cloots |
| 2001/0028807 A1 | 10/2001 | Coleman et al. |
| 2002/0028090 A1* | 3/2002 | Shin ................. G03G 15/11 399/250 |
| 2002/0112636 A1* | 8/2002 | Desaulniers ........... B41F 31/002 101/487 |
| 2003/0222068 A1 | 12/2003 | Horey et al. |
| 2004/0004070 A1 | 1/2004 | Sullivan et al. |
| 2004/0069167 A1* | 4/2004 | Dumoulin ............... B41F 13/22 101/217 |
| 2005/0093910 A1* | 5/2005 | Im ......................... B41J 2/0451 347/19 |
| 2005/0207774 A1 | 9/2005 | Sone et al. |
| 2008/0017061 A1 | 1/2008 | Muller et al. |
| 2013/0120775 A1 | 5/2013 | Elter et al. |
| 2018/0229516 A1 | 8/2018 | Cloots |
| 2021/0109462 A1* | 4/2021 | Maister ................ G03G 15/169 |

FOREIGN PATENT DOCUMENTS

| | | | | |
|---|---|---|---|---|
| JP | 10-143002 A | | 5/1998 | |
| JP | 2007098615 A | * | 4/2007 | |
| JP | 2007-163884 A | | 6/2007 | |
| RU | 2668421 C1 | * | 10/2018 | ............. B01J 35/04 |

* cited by examiner

| Y (%) | M (%) | C (%) | K (%) | ΔT (°C) |
|---|---|---|---|---|
| 0 | 0 | 0 | 50 | 3.9 |
| 0 | 0 | 0 | 100 | 5.4 |
| 50 | 0 | 0 | 100 | 5.4 |
| 100 | 0 | 0 | 100 | 5.6 |
| 0 | 50 | 0 | 100 | 5.4 |

OFFSET PRINT APPARATUS AND METHODS

BACKGROUND

Print apparatus may be used to print representations, such as text or images, onto print substrates. Print apparatus may print representations by offset printing methods. Offset printing may involve forming representations in a print agent on an intermediate printing surface and then transferring the print agent from the intermediate printing surface to a print substrate. The intermediate printing surface may be a blanket such as a rubber blanket. The printing agent may be an ink.

FIGURES

Various examples will be described below with reference to the following figures, wherein:

FIG. 3 illustrates: (a) three different regions (3A, 3B and 3C) of print agent on a blanket passing by a non-contact temperature sensor in the offset print apparatus of FIG. 1; and (b) an output from the non-contact temperature sensor as a function of time as the regions 3A, 3B and 3C pass by;

DESCRIPTION

Figure 1:
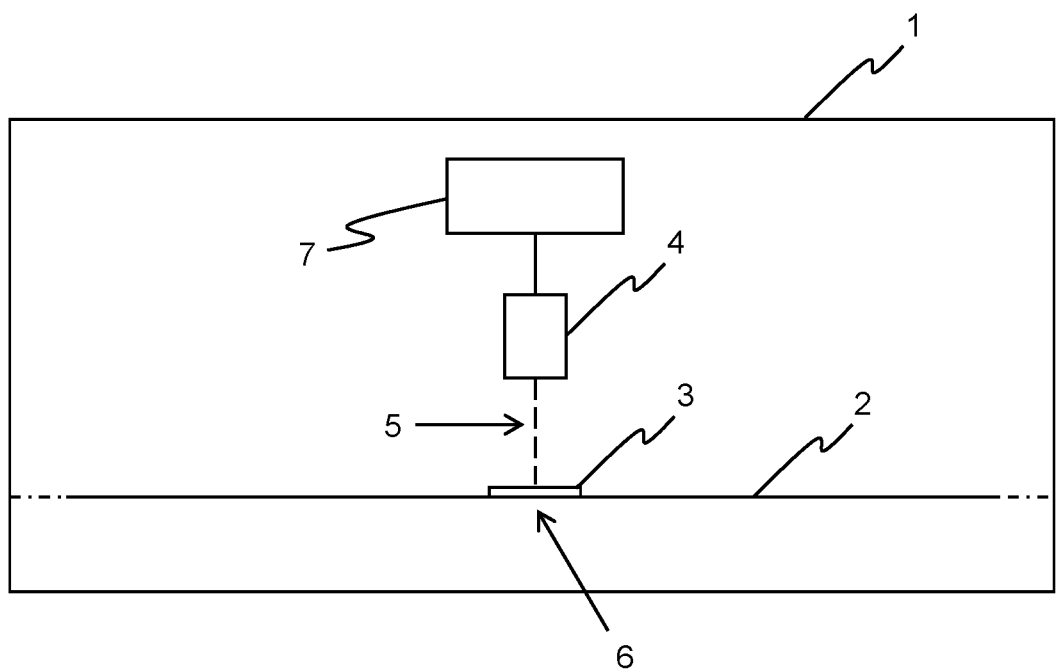
FIG. 1 is a schematic cross-sectional view of a portion of an example offset print apparatus.

FIG. 1 is a schematic illustration of an example offset print apparatus 1. The offset print apparatus 1 comprises a blanket 2 to receive print agent 3, a non-contact temperature sensor 4 to monitor electromagnetic radiation 5 from a measurement location 6 of the blanket 2 and generate a respective output, and a controller 7. The controller 7 is to receive the output from the non-contact temperature sensor 4, to determine coverage information relating to a print agent coverage of the blanket 2 at the measurement location 6, and to calculate a temperature of the blanket 2 at the measurement location 6 taking into account both the output from the non-contact temperature sensor 4 and the determined coverage information.

The temperature of the blanket 2 at the measurement location 6, calculated by the controller 7 taking into account both the output from the non-contact temperature sensor 4 and the determined coverage information, may be an estimated temperature of the blanket 2 at the measurement location 6. By taking into account both the output from the non-contact temperature sensor 4 and the determined coverage information in calculating the (i.e. estimated) temperature of the blanket 2 at the measurement location 6, the temperature of the blanket 2 at the measurement location 6 may be estimated more accurately than if the coverage information were not taken into account. In some examples, taking into account both the output from the non-contact temperature sensor 4 and the determined coverage information in calculating the temperature of the blanket 2 at the measurement location 6 comprises at least partially compensating the output from the non-contact temperature sensor 4 for an effect of print agent coverage at the measurement location 6 on electromagnetic radiation monitoring (e.g. an effect of print agent coverage at the measurement location 6 on electromagnetic radiation 5 emitted and/or reflected from the blanket 2 at the measurement location 6 and/or from print agent 3 on the blanket 2 at the measurement location 6).

The blanket 2 may have a non-uniform temperature distribution. For example, surface portions of the blanket 2 may have different temperatures from core (i.e. non-surface) portions of the blanket 2. That is to say, there may be a non-uniform temperature distribution across a thickness of the blanket 2. The temperature of the blanket 2 calculated at the measurement location 6 (i.e. calculated taking into account both the output from the non-contact temperature sensor 4 and the determined coverage information) may be a surface temperature of the blanket 2. The surface temperature of the blanket 2 may be the temperature of a surface portion of the blanket 2 on a side of the blanket 2 facing (i.e. closest to) the non-contact temperature sensor 4. In addition, since any amount of print agent 3 present on the blanket 2 is generally thin (i.e. in a direction locally perpendicular to the surface of the blanket 2 where the print agent 3 is located), a difference between the temperature of the print agent 3 on the blanket 2 and the temperature of the blanket 2 (i.e. the surface temperature of the blanket 2) at the same location (e.g. the measurement location 6) may be negligible such that the temperature of the print agent 3 on the blanket 2 and the temperature of the blanket 2 (i.e. the surface temperature of the blanket 2) at the same location (e.g. the measurement location 6) may be considered to be equivalent, e.g. the same. Accordingly, where print agent 3 is present on the blanket 2 at the measurement location 6, the temperature of the blanket 2 (i.e. the surface temperature of the blanket 2) at the measurement location 6 (i.e. calculated taking into account both the output from the non-contact temperature sensor 4 and the determined coverage information) may be the temperature of the print agent 3 on the blanket 2 at the measurement location 6.

An offset print apparatus 1 of the type shown in FIG. 1 is suitable for use in offset printing of representations onto a print substrate. For example, the blanket 2 may be supported by rollers (not shown) which are rotatable to convey the blanket through the apparatus 1. Print agent 3 may be applied to the blanket 2 as it is conveyed through the apparatus 1. Print agent 3 may subsequently be transferred from the blanket 2 to a print substrate (not shown), for example at a location which is spaced apart from the location at which print agent 3 is applied to the blanket 2.

In some examples, the print agent 3 is an ink. In some examples, the blanket 2 is made of a resilient material such as a polymeric material, for example rubber or plastic, fabric, or a combination thereof.

In some examples, the offset print apparatus 1 is an analogue offset print apparatus and the print agent (e.g. ink) 3 is applied to the blanket 2 by an inked plate or roller. In some examples, the offset print apparatus 1 is a digital offset print apparatus and the print agent (e.g. ink) 3 is applied to the blanket 2 using digital printing techniques such inkjet printing or liquid electrophotographic printing (LEP) techniques. Accordingly, in some examples, the offset print apparatus 1 is a liquid electrophotographic print (LEP) apparatus and the print agent 3 is liquid electrophotographic ink.

Figure 2:
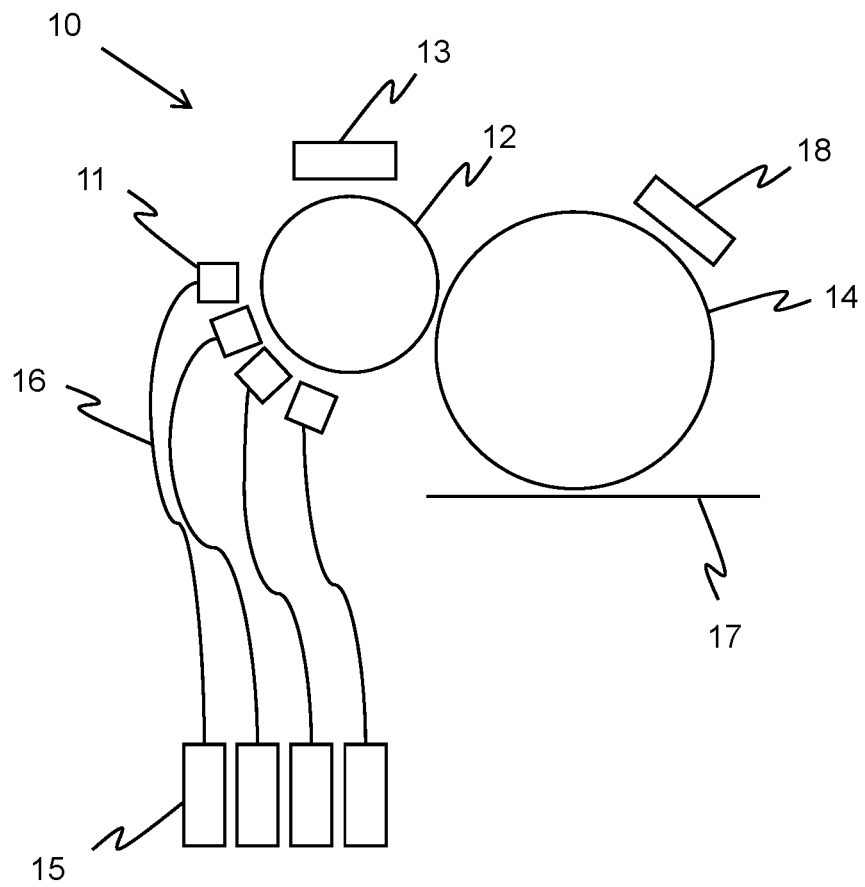
FIG. 2 is a schematic illustration of an example liquid electrophotographic print apparatus.

For example, FIG. 2 illustrates a portion of an example LEP apparatus 10. LEP apparatus 10 comprises a plurality of ink developer assemblies 11 arranged around a photoimaging plate in the form of a photoconductive drum 12. A photocharging unit 13 and an intermediate transfer member in the form of a blanket 14 (corresponding to blanket 2 of offset print apparatus 1) are provided adjacent the photoconductive drum 12. The ink developer assemblies 11 are connected to ink tanks 15 by ink conduits 16. In use, an image, including any combination of graphics, text and images, may be communicated to the liquid electrographic printer 10. According to an illustrative example, an initial image is formed on the rotating photoimaging drum 12 by the photocharging unit 13. Firstly, the photocharging unit 13 deposits a uniform static charge on the photoimaging drum 12 and then a laser imaging portion of the photocharging unit 13 dissipates the static charges in selected portions of the image area on the photoimaging drum 12 to leave a latent electrostatic image. The latent electrostatic image is an electrostatic charge pattern representing the image to be printed. Liquid electrophotographic ink may then be transferred to the photoimaging drum 12 by the ink developer assemblies 11 by way of rollers. The ink developer assemblies 11 present a uniform film of liquid electrophotographic ink to the photoimaging drum 12. The liquid electrophotographic ink contains an electrically charged resin component which, by virtue of an appropriate potential on the electrostatic image areas, is attracted to the latent electrostatic image on the photoimaging drum 12. The liquid electrophotographic ink does not adhere to the uncharged, non-image areas and forms an image on the surface of the latent electrostatic image. The photoimaging drum 12 then has a toner image on its surface. The toner image is then transferred from the photoimaging drum 12 to the blanket 14 by virtue of an appropriate potential applied between the photoimaging drum 12 and the blanket 14, such that the charged liquid electrophotographic ink is attracted to the blanket 14. The image may then be dried and fused on the blanket 14 by dryer 18 before being transferred to a print substrate 17.

Figure 3:
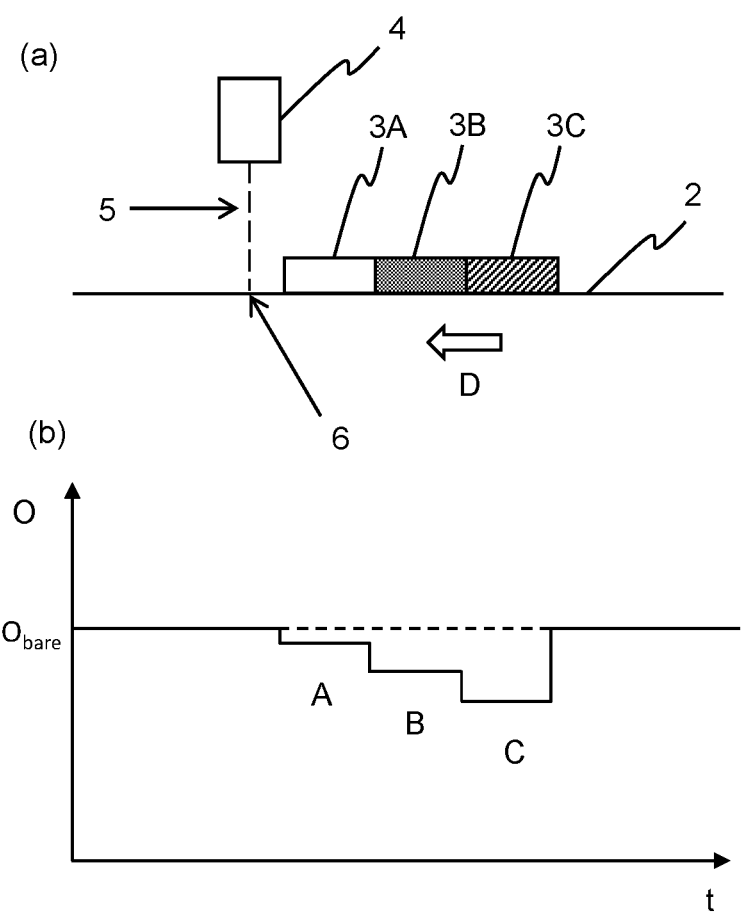

FIG. 3 illustrates schematically how the output from the non-contact temperature sensor 4 of offset print apparatus 1 may depend on print agent coverage of the blanket 2 at the measurement location 6. In particular, FIG. 3 (a) illustrates three different regions 3A, 3B and 3C of print agent on the blanket 2. The print agent coverage of the blanket 2 is different in each region 3A, 3B and 3C. However, the temperature of the blanket 2 and the print agent 3 is the same in each of the regions 3A, 3B and 3C, as well as in regions of the blanket not covered by print agent. The blanket 2 moves in a direction, D, past the non-contact temperature sensor 4, which monitors electromagnetic radiation 5 from the measurement location 6 and generates a corresponding output, O.

FIG. 3 (b) illustrates schematically the output, O, from the non-contact temperature sensor 4 as a function of time, t. The output, O, is shown as a solid black line. A dashed line indicates the output, $O_{bare}$, which would be expected (based on the temperature of the blanket) when there is no print agent on the blanket at the measurement location 6. Regions A, B and C correspond to periods of time during which regions 3A, 3B and 3C, respectively, pass beneath the non-contact temperature sensor 4. As can be seen in FIG. 3 (b), the output from the non-contact temperature sensor 4 changes as the different regions 3A, 3B and 3C pass by, even though the temperature of each region is the same. Accordingly, if the temperature of the blanket 2 were calculated based solely on the output from the non-contact temperature sensor 4 (i.e. not taking into account the print agent coverage), the temperature calculated would appear to change as different regions 3A, 3B and 3C passed by. The temperature calculated would therefore be inaccurate. In practice, temperature measurement inaccuracies of about 5° C. to about 10° C. can occur when measuring temperatures at about 100° C. in offset print apparatus when print agent coverage is not taken into account.

However, as explained hereinabove, by taking into account the determined coverage information in calculating the (i.e. estimated) temperature of the blanket 2 at the measurement location 6, the temperature of the blanket 2 at the measurement location 6 may be estimated more accurately. Moreover, by taking into account both the output from the non-contact temperature sensor 4 and the determined coverage information in calculating the (i.e. estimated) temperature of the blanket 2 at the measurement location 6, the temperature of the blanket 2 at the measurement location 6 may be estimated more accurately in real time (i.e. on the fly) during printing. That is to say, the temperature of the blanket 2 at the measurement location 6 may be estimated more accurately without stopping the printing process (e.g. stopping movement of the blanket 2) to recalibrate the non-contact temperature sensor 4 and/or the controller 7 as print agent coverage is varied, as might otherwise be performed in order to compensate for the effect of print agent coverage on the output from the non-contact temperature sensor 4.

The temperature of the blanket 2 at the measurement location 6, as calculated by the controller 7 taking into account both the output from the non-contact temperature sensor 4 and the determined coverage information, may be used in controlling an offset print apparatus process or multiple offset print apparatus processes. That is to say, the temperature of the blanket 2 at the measurement location 6, as calculated by the controller 7 taking into account both the output from the non-contact temperature sensor 4 and the determined coverage information, may be used in controlling an offset print apparatus device. For example, the controller 7 may control operation of the offset print apparatus device based on the estimated temperature of the blanket 2 at the measurement location 6. The offset print apparatus device may be a temperature regulating device to regulate a temperature in the offset print apparatus 1. The offset print apparatus device may be a dryer to dry print agent 3 on the blanket 2. For example, the dryer may be the dryer 18 of LEP print apparatus 10. The dryer may be a heater. The controller 7 may be to set an operating parameter of the offset print apparatus device (for example, the temperature regulating device, the dryer or the heater) based on the temperature of the blanket 2. The operating parameter of the offset print apparatus device (for example, the temperature regulating device, the dryer or the heater) may be a power supplied to said offset print apparatus device, an operating temperature of the offset print apparatus device and/or a length of time for which the offset print apparatus device is operated.

Because the temperature of the blanket 2 at the measurement location 6, as calculated by the controller 7 taking into account both the output from the non-contact temperature sensor 4 and the determined coverage information, is more accurate (i.e. than a temperature calculated not taking into account the coverage information), the offset print apparatus device may be controlled more accurately. For example, the operating parameter of the dryer may be set so as to achieve a targeted amount of print agent drying. Accurate calculation of the blanket temperature at the measurement location 6 may therefore enable underdrying or overdrying of print agent agent on the blanket 2 to be reduced or avoided.

In some examples, the controller 7 is to: select temperature sensor compensation data based on the determined coverage information; and calculate the temperature of the blanket 2 at the measurement location 6 taking into account both the output from the non-contact temperature sensor 4 and the selected temperature sensor compensation data. Selecting temperature sensor compensation data may comprise selecting temperature sensor compensation data, based on the determined coverage information, from predetermined temperature sensor compensation data stored in a memory with which the controller 7 is in electronic communication.

The selected temperature sensor compensation data may comprise (e.g. be) a temperature correction parameter value. The predetermined temperature sensor compensation data may comprise a plurality of predetermined temperature correction parameter values. Selecting temperature sensor compensation data may therefore comprise selecting a temperature correction parameter value from a plurality of predetermined temperature correction parameter values. The predetermined temperature correction parameter values may be stored in the memory, for example in a lookup table.

Each of the predetermined temperature correction parameter values may be associated with a respective print agent coverage of the blanket 2. Selecting the temperature compensation data based on the determined coverage information may therefore comprise selecting a temperature correction parameter value from the plurality of predetermined temperature correction parameter values based on the determined coverage information relating to the print agent coverage of the blanket 2 at the measurement location 6.

Calculating the temperature of the blanket 2 at the measurement location 6 taking into account both the output from the non-contact temperature sensor 4 and the selected temperature sensor compensation data may comprise calculating the temperature of the blanket 2 at the measurement location 6 taking into account both the output from the non-contact temperature sensor 4 and the selected temperature correction parameter value. Calculating the temperature of the blanket 2 at the measurement location 6 taking into account both the output from the non-contact temperature sensor 4 and the selected temperature sensor compensation data may comprise inputting the output from the non-contact temperature sensor 4 and the selected temperature correction parameter value into a function for calculating the temperature of the blanket 2. The function may parametrise a mathematical relationship between the output from the non-contact temperature sensor 4, the print agent coverage of the blanket 2 and the temperature of the blanket 2 in terms of the temperature correction parameter. In some examples, calculating the temperature of the blanket 2 at the measurement location 6 comprises adding or subtracting the selected temperature correction parameter value to or from the output from the non-contact temperature sensor 4. In some examples, calculating the temperature of the blanket 2 at the measurement location 6 comprises multiplying or dividing the output from the non-contact temperature sensor 4 with or by the temperature correction parameter value.

In some examples, the controller 7 is to receive coverage information relating to a print agent coverage of the blanket 2. In some examples, the coverage information relating to the print agent coverage of the blanket 2 is the coverage information relating to the print agent coverage of the blanket 2 at the measurement location 6. In some examples, the coverage information relating to the print agent coverage of the blanket 2 is coverage information relating to print agent coverage of a portion of the blanket 2 containing the measurement location 6. Accordingly, the coverage information relating to the print agent coverage of the blanket 2 may comprise the coverage information relating to the print agent coverage of the blanket 2 at the measurement location 6.

In some examples, the controller 7 is to receive the coverage information relating to the print agent coverage of the blanket 2 from an image pipeline module. The image pipeline module may be a module which determines print agent coverage of the blanket 2. For example, the image pipeline module may determine where print agent is applied to the blanket 2 and/or how much print agent is applied to the blanket 2 and/or what type of print agent is applied to the blanket 2, for a given printing operation. The image pipeline module may be implemented in hardware and/or software. The image pipeline module may be independent of (i.e. neither comprising nor forming part of) the non-contact temperature sensor 4. In examples in which the image pipeline module is implemented in hardware (and optionally also in software), the image pipeline module may be physically upstream of the non-contact temperature sensor 4 in the sense that the image pipeline module may be spaced apart from the non-contact temperature sensor 4 and located closer to a location at which print agent is applied to the blanket 2 than to the non-contact temperature sensor 4.

The controller 7 may receive the coverage information (for example, from the image pipeline module) continuously. The controller 7 may receive the coverage information (for example, from the image pipeline module) discontinuously, for example periodically. For example, the controller 7 may receive the coverage information (for example, from the image pipeline module) at predetermined time intervals.

Print agent coverage of the blanket 2 at a given location may be a measure of an amount of print agent on the blanket 2 at the given location and/or a type of print agent on the blanket 2 at the given location. The amount of print agent on the blanket 2 may be defined as an absolute amount (for example, in terms of a surface area, depth, volume or mass) or a relative amount (for example, in terms of an area fraction or percentage) of print agent on the blanket 2. The type of print agent on the blanket 2 may be defined as a class of print agent (for example, whether the print agent is an inkjet printer ink or a liquid electrophotographic ink), a composition or characteristic component of the print agent, a pigmentation (for example, a colour or a depth of colour) of the print agent, or an electromagnetic property of the print agent (for example, an opacity, reflectivity or emissivity of the print agent with respect to electromagnetic radiation, for example infrared radiation or visible light).

Coverage information may therefore comprise information relating to an amount (e.g. an absolute amount (for example, in terms of a surface area, depth, volume or mass) or a relative amount (for example, in terms of an area fraction or percentage)) of print agent and/or a type (e.g. defined by a class of print agent (for example, whether the print agent is an inkjet printer ink or a liquid electrophotographic ink), a composition or characteristic component of the print agent, a pigmentation (for example, a colour or a depth of colour) of the print agent, or an electromagnetic property of the print agent (for example, an opacity, reflectivity or emissivity of the print agent with respect to electromagnetic radiation, for example infrared radiation or visible light)) of print agent on the blanket 2. For example, coverage information for the measurement location 6 may comprise information relating to an amount (e.g. an absolute amount (for example, in terms of a surface area, depth, volume or mass) or a relative amount (for example, in terms of an area fraction or percentage)) of print agent and/or a type (e.g. defined by a class of print agent (for example, whether the print agent is an inkjet printer ink or a liquid electrophotographic ink), a composition or characteristic component of the print agent, a pigmentation (for example, a colour or a depth of colour) of the print agent, or an electromagnetic property of the print agent (for example, an opacity, reflectivity or emissivity of the print agent with respect to electromagnetic radiation, for example infrared radiation or visible light)) of print agent on the blanket 2 at measurement location 6.

Accordingly, in some examples, each of the predetermined temperature correction parameter values (for example, stored in the lookup table in the memory) is associated with a respective amount and/or type of print agent on the blanket 2 at the measurement location 6.

Figures 4, 5:
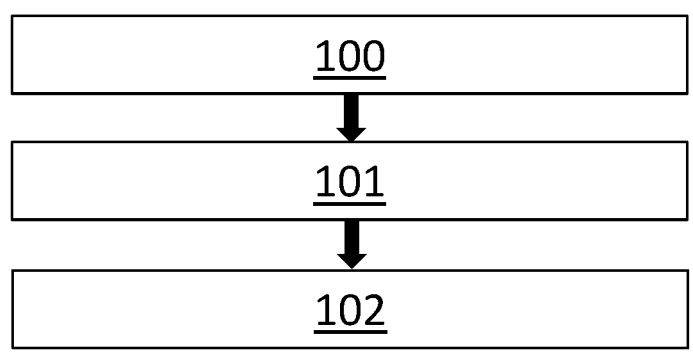
FIG. 4 illustrates an example lookup table of temperature sensor compensation data.
FIG. 5 is a flowchart illustrating an example method of operating the offset print apparatus of FIG. 1.

For example, FIG. 4 illustrates a lookup table of temperature sensor compensation data. In this example, the print agent coverage of the blanket is defined by the area fraction of the blanket (expressed as a percentage) covered by yellow (Y), magenta (M), cyan (C) and black (K) ink. For each particular combination of Y, M, C and K ink coverage, the lookup table defines a value of a temperature correction parameter $\Delta T$ (expressed in ° C.). In this example, calculating the temperature, T, of the blanket at the measurement location taking into account both the output from the non-contact temperature sensor and the determined coverage information comprises selecting the appropriate value of the temperature correction parameter, $\Delta T$, for the print agent coverage of the blanket at the measurement location and adding this value to a temperature, $T_0$, corresponding to the output from the non-contact temperature sensor according to:

$$T=T_0+\Delta T$$

In some examples, the non-contact temperature sensor 4 monitors electromagnetic radiation emitted and/or reflected by the blanket 2 and/or print agent 3 on the blanket 2 at the measurement location 6. For example, the non-contact temperature sensor may measure an amount or an intensity, or a change in amount or intensity, of electromagnetic radiation emitted and/or reflected by the blanket 2 and/or print agent 3 on the blanket 2 at the measurement location 6. The output from the non-contact temperature sensor 4 may depend on (for example, be proportional to) the amount or intensity, or the change in amount or intensity, of electromagnetic radiation emitted and/or reflected by the blanket 2 and/or print agent 3 on the blanket 2 at the measurement location 6. Emission and/or reflection of electromagnetic radiation by the blanket 2 and/or the print agent 3 may be temperature-dependent. The output from the non-contact temperature sensor 4 may therefore depend on the temperature of the blanket 2 and/or print agent 3 on the blanket 2 at the measurement location 6. Accordingly, the output from the non-contact temperature sensor 4 may be indicative of a (e.g. estimated) temperature of the blanket 2 and/or print agent 3 on the blanket 2 at the measurement location 6.

In some examples, the non-contact temperature sensor 4 monitors electromagnetic radiation emitted by, and electromagnetic radiation reflected by, the blanket 2 and/or print agent 3 on the blanket 2 at the measurement location 6. In some examples, although the non-contact temperature sensor 4 monitors electromagnetic radiation emitted by, and electromagnetic radiation reflected by, the blanket 2 and/or print agent 3 on the blanket 2 at the measurement location 6, the amount or intensity of electromagnetic radiation emitted by the blanket 2 and/or the print agent 3 on the blanket 2 is indicative of (e.g. depends on) the temperature of the blanket 2 and/or the print agent 3 on the blanket 2 at the measurement 6, whereas the amount or intensity of electromagnetic radiation reflected by the blanket 2 and/or the print agent 3 on the blanket 2 is not indicative of (e.g. does not depend on) the temperature of the blanket 2 and/or the print 3 on the blanket 2 at the measurement 6. In such examples, calculating the (i.e. estimated) temperature of the blanket 2 at the measurement location 6 taking into account both the output from the non-contact temperature sensor 4 and the determined coverage information may therefore comprise compensating the output from the non-contact temperature sensor 4 for the amount or intensity of electromagnetic radiation reflected by the blanket 2 and/or the print agent 3, for example wherein the amount or intensity of electromagnetic radiation reflected depends on the print agent coverage of the blanket 2.

In some examples, the electromagnetic radiation is infrared radiation. In some examples, the non-contact temperature sensor 4 is an infrared temperature sensor 4. The infrared temperature sensor 4 may monitor infrared radiation emitted by the blanket 2 and/or print agent 3 on the blanket 2 at the measurement location 6 and generate the respective output. For example, the infrared temperature sensor 4 may measure an amount or intensity, or a change in amount or intensity, of infrared radiation emitted by the blanket 2 and/or print agent 3 on the blanket 2 at the measurement location 6. The output from the infrared temperature sensor 4 may depend on (for example, be proportional to) the amount or intensity, or the change in amount or intensity, of infrared radiation emitted by the blanket 2 and/or print agent 3 on the blanket 2 at the measurement location 6. Emission or reflection of infrared radiation by the blanket 2 and/or print agent 3 may be temperature-dependent. For example, the infrared emissivity of the blanket 2 and/or print agent 3 may be temperature-dependent. The output from the infrared temperature sensor 4 may therefore also depend on the temperature of the blanket 2 and/or print agent 3 on the blanket 2 at the measurement location 6. Accordingly, the output from the infrared temperature sensor may be indicative of a (e.g. estimated) temperature of the blanket 2 and/or print agent 3 on the blanket 2 at the measurement location 6.

The offset print apparatus 1 may further comprise a plurality of non-contact temperature sensors 4, each non-contact temperature sensor 4 to monitor electromagnetic radiation 5 from a corresponding measurement location of a plurality of measurement locations 6 of the blanket 2 and generate a respective output. The controller 7 may be to receive the outputs from the non-contact temperature sensors 4, to determine coverage information relating to a print agent coverage of the blanket 2 at each measurement location 6, and to calculate a temperature of the blanket 2 at each measurement location 6 taking into account both the outputs from the non-contact temperature sensors 4 and the determined coverage information. The or each non-contact temperature sensor 4 may be fixed in position within the offset print apparatus 1.

The measurement location 6 may be a measurement point, for example a measurement spot, on the blanket 2. The measurement location 6 may be a measurement area on the blanket 2. The measurement area may be elongate. For example, the measurement area may be an elongate, oblong measurement area (e.g. a measurement strip). A major axis of the elongate, oblong measurement area may be aligned with a direction of travel of the blanket 2.

In some examples, a method of operating the offset print apparatus 1 (as illustrated schematically in FIG. 5) may include: receiving an output from the non-contact temperature sensor 4 (block 100 of FIG. 5); determining coverage information relating to a print agent coverage of the blanket 2 at the measurement location 6 (block 101 of FIG. 5); and calculating a temperature of the blanket 2 at the measurement location 6 taking into account both the output from the non-contact temperature sensor 4 and the determined coverage information (block 102 of FIG. 5).

In some examples, the method comprises: the controller 7 controlling operation of an offset print apparatus device based on the calculated temperature of the blanket 2 at the measurement location 6. The offset print apparatus device may be a temperature regulating device to regulate a temperature in the offset print apparatus 1. The offset print apparatus device may be a dryer to dry print agent 3 on the blanket 2. The dryer may be a heater. Accordingly, the method may comprise: setting an operating parameter of the offset print apparatus (for example, the temperature regulative device, dryer, or heater) based on the temperature of the blanket 2. The operating parameter of the offset print apparatus device (for example, the temperature regulating device, the dryer or the heater) may be a power supplied to said offset print apparatus device, an operating temperature of the offset print apparatus device and/or a length of time for which the offset print apparatus device is operated.

In some examples, the method comprises: selecting temperature sensor compensation data based on the determined coverage information; and calculating the temperature of the blanket 2 at the measurement location 6 taking into account both the output from the non-contact temperature sensor 4 and the selected temperature sensor compensation data. Selecting temperature sensor compensation data may comprise selecting temperature sensor compensation data, based on the determined coverage information, from predetermined temperature sensor compensation data stored in a memory with which the controller 7 is in electronic communication.

The selected temperature sensor compensation data may comprise (e.g. be) a temperature correction parameter value. The predetermined temperature sensor compensation data may comprise a plurality of predetermined temperature correction parameter values. Selecting temperature sensor compensation data may therefore comprise selecting a temperature correction parameter value from a plurality of predetermined temperature correction parameter values. The predetermined temperature correction parameter values may be stored in the memory, for example in a lookup table.

Each of the predetermined temperature correction parameter values may be associated with a respective print agent coverage of the blanket 2. Selecting the temperature compensation data based on the determined coverage information may therefore comprise selecting a temperature correction parameter value from the plurality of predetermined temperature correction parameter values based on the determined coverage information relating to the print agent coverage of the blanket 2 at the measurement location 6.

Calculating the temperature of the blanket 2 at the measurement location 6 taking into account both the output from the non-contact temperature sensor 4 and the selected temperature sensor compensation data may comprise calculating the temperature of the blanket 2 at the measurement location 6 taking into account both the output from the non-contact temperature sensor 4 and the selected temperature correction parameter value. Calculating the temperature of the blanket 2 at the measurement location 6 taking into account both the output from the non-contact temperature sensor 4 and the selected temperature sensor compensation data may comprise inputting the output from the non-contact temperature sensor 4 and the selected temperature correction parameter value into a function for calculating the temperature of the blanket 2. The function may parametrise a mathematical relationship between the output from the non-contact temperature sensor 4, the print agent coverage of the blanket 2 and the temperature of the blanket 2 in terms of the temperature correction parameter. In some examples, calculating the temperature of the blanket 2 at the measurement location 6 comprises adding or subtracting the selected temperature correction parameter value to or from the output from the non-contact temperature sensor 4. In some examples, calculating the temperature of the blanket 2 at the measurement location 6 comprises multiplying or dividing the output from the non-contact temperature sensor 4 with or by the temperature correction parameter value.

In some examples, determining coverage information relating to print agent coverage of the blanket 2 at the measurement location 6 comprises receiving coverage information relating to a print agent coverage of the blanket 2. In some examples, the coverage information relating to the print agent coverage of the blanket 2 is the coverage information relating to the print agent coverage of the blanket 2 at the measurement location 6. In some examples, the coverage information relating to the print agent coverage of the blanket 2 is coverage information relating to print agent coverage of a portion of the blanket 2 containing the measurement location 6. Accordingly, the coverage information relating to the print agent coverage of the blanket 2 may comprise the coverage information relating to the print agent coverage of the blanket 2 at the measurement location 6.

Print agent coverage of the blanket 2 at a given location may be a measure of an amount of print agent on the blanket 2 at the given location and/or a type of print agent on the blanket 2 at the given location. The amount of print agent on the blanket 2 may be defined as an absolute amount (for example, in terms of a surface area, depth, volume or mass) or a relative amount (for example, in terms of an area fraction or percentage) of print agent on the blanket 2. The type of print agent on the blanket 2 may be defined as a class of print agent (for example, whether the print agent is an inkjet printer ink or a liquid electrophotographic ink), a composition or characteristic component of the print agent, a pigmentation (for example, a colour or a depth of colour) of the print agent, or an electromagnetic property of the print agent (for example, an opacity, reflectivity or emissivity of the print agent with respect to electromagnetic radiation, for example infrared radiation or visible light).

Coverage information may therefore comprise information relating to an amount (e.g. an absolute amount (for example, in terms of a surface area, depth, volume or mass) or a relative amount (for example, in terms of an area fraction or percentage)) of print agent and/or a type (e.g. defined by a class of print agent (for example, whether the print agent is an inkjet printer ink or a liquid electrophotographic ink), a composition or characteristic component of the print agent, a pigmentation (for example, a colour or a depth of colour) of the print agent, or an electromagnetic property of the print agent (for example, an opacity, reflectivity or emissivity of the print agent with respect to electromagnetic radiation, for example infrared radiation or visible light)) of print agent on the blanket 2. For example, coverage information for the measurement location 6 may comprise information relating to an amount (e.g. an absolute amount (for example, in terms of a surface area, depth, volume or mass) or a relative amount (for example, in terms of an area fraction or percentage)) of print agent and/or a type (e.g. defined by a class of print agent (for example, whether the print agent is an inkjet printer ink or a liquid electrophotographic ink), a composition or characteristic component of the print agent, a pigmentation (for example, a colour or a depth of colour) of the print agent, or an electromagnetic property of the print agent (for example, an opacity, reflectivity or emissivity of the print agent with respect to electromagnetic radiation, for example infrared radiation or visible light)) of print agent on the blanket 2 at measurement location 6.

Accordingly, in some examples, each of the predetermined temperature correction parameter values (for example, stored in the lookup table in the memory) is associated with a respective amount and/or type of print agent on the blanket 2 at the measurement location 6.

For example, FIG. 4 illustrates a lookup table of temperature sensor compensation data. In this example, the print agent coverage of the blanket is defined by the area fraction of the blanket (expressed as a percentage) covered by yellow (Y), magenta (M), cyan (C) and black (K) ink. For each particular combination of Y, M, C and K ink coverage, the lookup table defines a value of a temperature correction parameter $\Delta T$ (expressed in ° C.). In this example, calculating the temperature, T, of the blanket at the measurement location taking into account both the output from the non-contact temperature sensor and the determined coverage information comprises selecting the appropriate value of the temperature correction parameter, $\Delta T$, for the print agent coverage of the blanket at the measurement location and adding this value to a temperature, $T_0$, corresponding to the output from the non-contact temperature sensor according to:

$$T = T_0 + \Delta T$$

In some examples, the non-contact temperature sensor 4 monitors electromagnetic radiation emitted or reflected by the blanket 2 and/or print agent 3 on the blanket 2 at the measurement location 6. For example, the non-contact temperature sensor may measure an amount or an intensity, or a change in amount or intensity, of electromagnetic radiation emitted or reflected by the blanket 2 and/or print agent 3 on the blanket 2 at the measurement location 6. The output from the non-contact temperature sensor 4 may depend on (for example, be proportional to) the amount or intensity, or the change in amount or intensity, of electromagnetic radiation emitted or reflected by the blanket 2 and/or print agent 3 on the blanket 2 at the measurement location 6. Emission or reflection of electromagnetic radiation by the blanket 2 and/or the print agent 3 may be temperature-dependent. The output from the non-contact temperature sensor 4 may therefore depend on the temperature of the blanket 2 and/or print agent 3 on the blanket 2 at the measurement location 6. Accordingly, the output from the non-contact temperature sensor 4 may be indicative of a (e.g. estimated) temperature of the blanket 2 and/or print agent 3 on the blanket 2 at the measurement location 6.

In some examples, the electromagnetic radiation is infrared radiation. In some examples, the non-contact temperature sensor 4 is an infrared temperature sensor 4. The infrared temperature sensor 4 may monitor infrared radiation emitted by the blanket 2 and/or print agent 3 on the blanket 2 at the measurement location 6 and generate the respective output. For example, the infrared temperature sensor 4 may measure an amount or intensity, or a change in amount or intensity, of infrared radiation emitted by the blanket 2 and/or print agent 3 on the blanket 2 at the measurement location 6. The output from the infrared temperature sensor 4 may depend on (for example, be proportional to) the amount or intensity, or the change in amount or intensity, of infrared radiation emitted by the blanket 2 and/or print agent 3 on the blanket 2 at the measurement location 6. Emission or reflection of infrared radiation by the blanket 2 and/or print agent 3 may be temperature-dependent. For example, the infrared emissivity of the blanket 2 and/or print agent 3 may be temperature-dependent. The output from the infrared temperature sensor 4 may therefore also depend on the temperature of the blanket 2 and/or print agent 3 on the blanket 2 at the measurement location 6. Accordingly, the output from the infrared temperature sensor may be indicative of a (e.g. estimated) temperature of the blanket 2 and/or print agent 3 on the blanket 2 at the measurement location 6.

Figure 6:
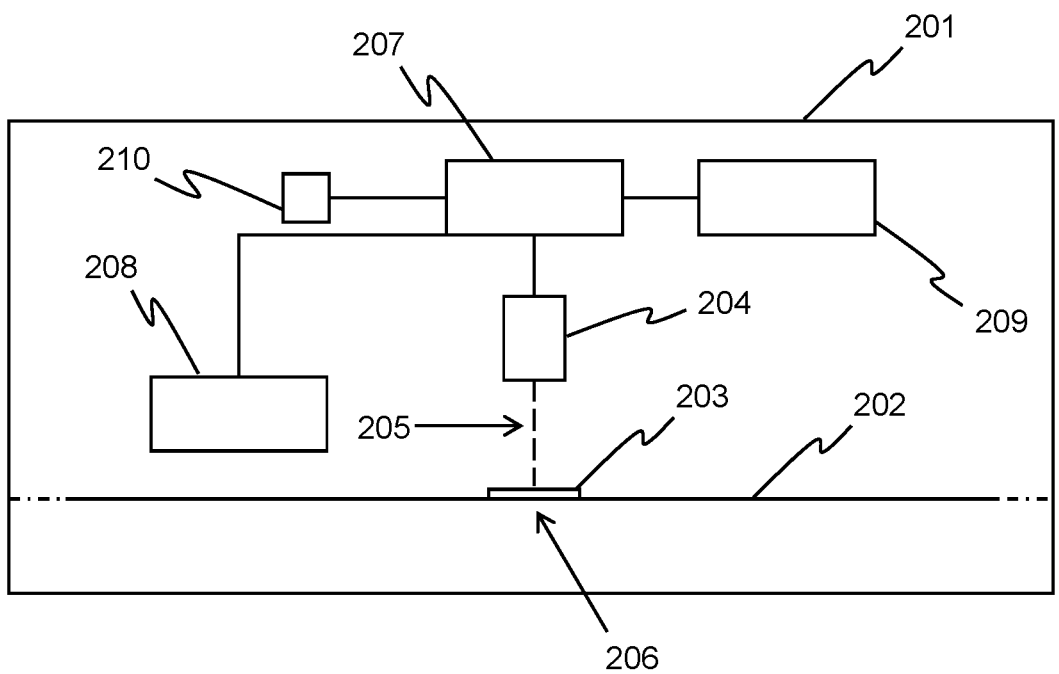
FIG. 6 is a schematic cross-sectional view of a portion of an alternative example offset print apparatus.

FIG. 6 is a schematic illustration of an example offset print apparatus 201. The offset print apparatus 201 comprises a blanket 202 to receive print agent 203, an infrared temperature sensor 204 to monitor infrared radiation 205 emitted from a measurement location 206 of the blanket 202 and generate a respective output, a controller 207, a dryer 208 to dry print agent on the blanket 202, an upstream image pipeline module 209 to supply coverage information relating to a print agent coverage of the blanket 202 at the measurement location 206 to the controller 207, and a memory 210 storing temperature sensor compensation data.

The controller 207 is: to receive the output from the infrared temperature sensor 204; to receive the coverage information relating to the print agent coverage of the blanket 202 at the measurement location 206 from the upstream image pipeline module 209; to select temperature sensor compensation data from the memory 210 based on the received coverage information; to calculate the temperature of the blanket 202 at the measurement location 206 taking into account both the output from the infrared temperature sensor 204 and the selected temperature sensor compensation data; and to set an operating parameter of the dryer 208 based on the temperature of the blanket 202.

By selecting temperature sensor compensation data based on the received coverage information, and by taking into account both the output from the infrared temperature sensor 204 and the selected temperature sensor compensation data (based on the received coverage information) in calculating the temperature of the blanket 202 at the measurement location 206, the output from the infrared temperature sensor 204 may be at least partially compensated for an effect of print agent coverage on infrared emissivity of the blanket 202 at the measurement location 206. An appropriate operating parameter of the dryer 208 may therefore be set, taking into account the calculated temperature of the blanket 202 (i.e. compensated for an effect of print agent coverage).

The operating parameter of the dryer 208 may be a power supplied to the dryer, an operating temperature of the dryer and/or a length of time for which the dryer is operated.

Figure 7:
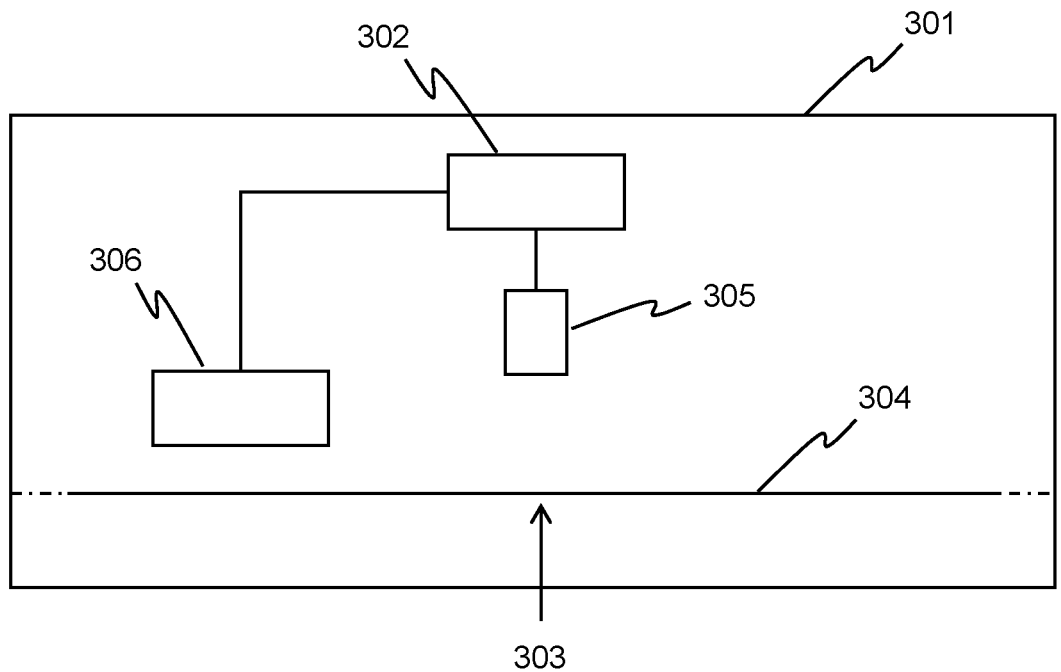
FIG. 7 is a schematic cross-sectional view of a portion of a further alternative example offset print apparatus.

FIG. 7 is a schematic illustration of an offset print apparatus 301. Offset print apparatus 301 comprises a controller 302 to estimate temperature at a measurement location 303 of a blanket 304 using a non-contact sensor 305, and to control a dryer 306 based on an estimated temperature, wherein the print apparatus 301 is to estimate temperature at the measurement location 303 as a function of coverage information relating to a print agent coverage of the blanket 304 at the measurement location 303. The controller 302 may be to receive coverage information relating to a print agent coverage of the blanket 304 from an image pipeline module. The non-contact sensor 305 may be an infrared temperature sensor.

It will be understood that various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. Offset print apparatus comprising:
a blanket to receive print agent;
a non-contact temperature sensor to monitor electromagnetic radiation from a measurement location of the blanket and generate a respective output; and
a controller to:
receive the output from the non-contact temperature sensor;
determine coverage information relating to a print agent coverage of the blanket at the measurement location; and
calculate a temperature of the blanket at the measurement location taking into account both the output from the non-contact temperature sensor and the determined coverage information.

2. The offset print apparatus according to claim 1, wherein the controller is to control operation of an offset print apparatus device based on the temperature of the blanket at the measurement location.

3. The offset print apparatus according to claim 1, wherein the offset print apparatus is liquid electrophotographic print (LEP) apparatus and the print agent is liquid electrophotographic ink.

4. The offset print apparatus according to claim 1, wherein the controller is to: select temperature sensor compensation data based on the determined coverage information; and calculate the temperature of the blanket at the measurement location taking into account both the output from the non-contact temperature sensor and the selected temperature sensor compensation data.

5. The offset print apparatus according to claim 1, wherein the controller is to receive coverage information relating to a print agent coverage of the blanket.

6. The offset print apparatus according to claim 1, wherein the coverage information for a measurement location comprises information relating to the amount of print agent and/or the type of print agent on the blanket at the measurement location.

7. The offset print apparatus according to claim 1, wherein the non-contact temperature sensor is an infrared temperature sensor.

8. A method of operating offset print apparatus, the offset print apparatus comprising a blanket to receive print agent and a non-contact temperature sensor to monitor electromagnetic radiation from a measurement location of the blanket and generate a respective output,
the method comprising:
receiving the output from the non-contact temperature sensor;
determining coverage information relating to a print agent coverage of the blanket at the measurement location; and
calculating a temperature of the blanket at the measurement location taking into account both the output from the non-contact temperature sensor and the determined coverage information.

9. The method according to claim 8 further comprising: controlling operation of an offset print apparatus device based on the temperature of the blanket at the measurement location.

10. The method according to claim 8, wherein the offset print apparatus is liquid electrophotographic print (LEP) apparatus and the print agent is liquid electrophotographic ink.

11. The method according to claim 8 comprising: selecting temperature sensor compensation data based on the determined coverage information; and calculating the temperature of the blanket at the measurement location taking into account both the output from the non-contact temperature sensor and the selected temperature sensor compensation data.

12. The method according to claim 8, wherein determining coverage information relating to print agent coverage of the blanket at the measurement location comprises receiving coverage information relating to a print agent coverage of the blanket.

13. The method according to claim 8, wherein the coverage information for the measurement location comprises information relating to the amount of print agent and/or the type of print agent on the blanket at the measurement location.

14. The method according to claim 8, wherein the non-contact temperature sensor is an infrared temperature sensor.

15. Offset print apparatus comprising a controller to estimate temperature at a measurement location of a blanket using a non-contact sensor, and to control a dryer based on an estimated temperature, wherein the print apparatus is to estimate temperature at the measurement location as a function of coverage information relating to a print agent coverage of the blanket at the measurement location.

* * * * *